Dec. 27, 1966 R. L. SNYDER 3,295,115

THIN MAGNETIC FILM MEMORY SYSTEM

Filed April 15, 1963 4 Sheets-Sheet 1

INVENTOR.
RICHARD L. SNYDER,
BY
Walter J. Adam
ATTORNEY.

INVENTOR.
RICHARD L. SNYDER,
BY
Walter J. Adam
ATTORNEY.

Dec. 27, 1966 R. L. SNYDER 3,295,115

THIN MAGNETIC FILM MEMORY SYSTEM

Filed April 15, 1963 4 Sheets-Sheet 3

INVENTOR.
RICHARD L. SNYDER,
BY
Walter J. Adam
ATTORNEY.

THIN MAGNETIC FILM MEMORY SYSTEM

INVENTOR.
RICHARD L. SNYDER,

Walter J. Adam
ATTORNEY.

3,295,115

THIN MAGNETIC FILM MEMORY SYSTEM

Richard L. Snyder, Fullerton, Calif., assignor to Hughes Aircraft Company, Culver City, Calif., a corporation of Delaware Filed Apr. 15, 1963, Ser. No. 273,124
6 Claims. (Cl. 340—174)

This invention relates to magnetic memory systems and particularly to a system utilizing improved thin magnetic film switching arrangements.

Conventional magnetic thin film core memories include thin films of magnetic material deposited so as to have a high degree of magnetic orientation. Such films are switched by a combination of two magnetic fields with one being in the reverse direction from the existing magnetic condition and the other being at right angles to the first field. For reading, a current pulse is applied to a word drive conductor which is arranged at right angles to the direction of orientation and a current pulse is applied to a sense and control conductor arranged parallel to the direction of orientation. The current in the word drive conductor generates a field in a direction opposite from that existing in the core when storing a binary "one", for example, and the current in the sense and control conductor provides a field to create an unbalance in the gyroscopic magnetic elements so that the core is switched or reversed. If the core is in the "zero" position at the time the disturbing fields are generated, switching does not occur but undesired noise signals may be sensed from the magnetic disturbances. During writing, a reverse pulse is applied to the word drive conductor and a pulse is applied to the sense and control conductor only if a "one" is to be written. In these arrangements, the disturbances developed by the control current pulse being applied to the sense and control conductors during reading makes reliable interrogation very difficult. It would be highly desirable if this disturbance during the read phase of the operating cycle were eliminated.

It is therefore an object of this invention to provide a thin film magnetic memory system in which switching during reading is accomplished by a single pulse.

It is a further object of this invention to provide a thin film memory system in which improved switching operation is provided by tilting the direction of magnetic orientation of the thin film core elements relative to the switching fields.

It is a still further object of this invention to provide a thin film magnetic memory element in which the direction of magnetic orientation is at a selected angle relative to the switching field so that reading is accomplished in response to a single applied field.

It is another object of this invention to provide a thin film magnetic memory element in which the thin film is magnetically oriented relative to the switching field and an ambient field is provided to allow fast switching in a first magnetic state and to prevent switching in a second magnetic state.

Briefly, in accordance with this invention, a thin film memory system includes a plurality of word conductors and a plurality of sense and control conductors with each sense and control conductor positioned adjacent to a selected bit position of the word conductors. A thin film magnetic core is positioned at each bit position or intersection of the word drive conductors and the sense and control conductors. Each core has a direction of magnetic orientation at a selected angle relative to the direction of current flow in the adjacent word drive conductor. An ambient field is applied to the thin films in a direction substantially at right angles to the direction of fields developed by current passing through the word conductors. The resulting direction of magnetization is a compromise between the effects of orientation of the film and the ambient field. For a stored "one" the ambient field effectively rotates the magnetic field to a switching position and for a stored "zero" the effect of the orientation is cancelled so that the magnetic field is substantially parallel to the fields developed by current passing through the word line. During the read phase, a read pulse is applied through the word line and only the stored "ones" which have tilted or rotated magnetic fields rapidly switch to the opposite state. The read pulse has substantially no effect on a stored "zero." During the write phase, all cores are initially in the "zero" position and the ambient field opposes the component of the word line field perpendicular to the direction of orientation during the write pulse and cancels it. A "one" is written by applying current pulses through the word conductor and through the sense and control conductors, the latter producing a field opposed to and greater than the ambient field to rotate the molecular magnets to an angle for ease of switching. Thus, a current is passed through the sense and control conductors during the write phase but not during the read phase.

The novel features which are believed to be characteristic of the invention, both as to its organization and method of operation, together with further objects and advantages thereof, will be better understood from the following description considered in connection with the accompanying drawings, in which like characters refer to like parts, and in which.

Figure 1:
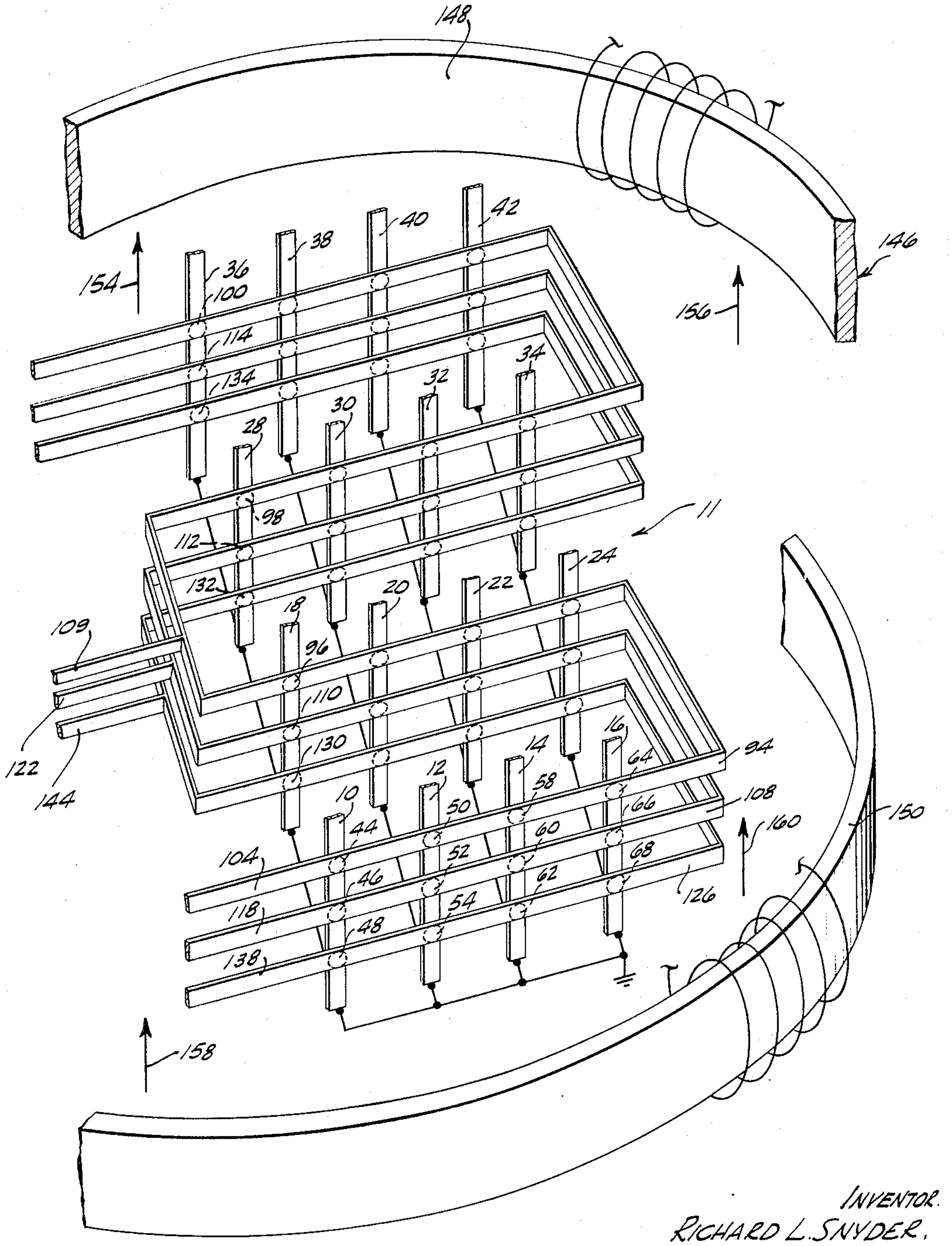
FIG. 1 is a schematic perspective drawing of a memory array in accordance with the invention.

Referring first to the memory array 11 of FIG. 1, an illustrative arrangement in accordance with the invention includes four columns and four rows of core elements with each column storing a three binary bit word. A first row includes word drive conductors 10, 12, 14 and 16, a second row includes word drive conductors 18, 20, 22 and 24, and a third row includes word drive conductors 28, 30, 32 and 34. Also, a fourth row includes word drive conductors 36, 38, 40 and 42. Each word drive or line conductor is positioned adjacent to three thin film cores such as the conductors 10, 12, 14 and 16 being respectively adjacent to cores 44, 46 and 48, cores 50, 52 and 54, cores 58, 60 and 62 and cores 64, 66 and 68. A sense and control conductor is positioned adjacent to each thin film core with a longitudinal axis at right angles to the longitudinal axis of the word line conductor. A sense and control conductor 94 is positioned adjacent to all cores in the first bit position such as the cores 44, 50, 58 and 64 in the first row and cores such as 96, 98 and 100 respectively in the second, third and fourth rows. The sense and control conductor 94 is positioned to pass in opposite directions at cores of adjacent rows from a first end 104 to a second end 106. The center portion of the sense and control conductor 94 is coupled to a lead 109. A sense and control conductor 108 is positioned adjacent to all cores in the second bit positions such as cores 46, 52, 60 and 66 in the first row and cores such as 110, 112 and 114 respectively in the second, third and fourth rows. The sense and control conductor 108 is wound in opposite directions at adjacent rows from a first end 118 to a second end 120. The center portion of the sense and control conductor 108 is coupled to a write control lead 122. A sense and control conductor 126 is positioned adjacent to all cores in the third bit position such as the cores 48, 54, 62 and 68 in the first row and cores such as 130, 132 and 134 respectively in the second, third and fourth rows. The sense and control conductor 126 is wound in adjacent rows in opposite directions from a first end 138 to a second end 140 with the center portion coupled to a write control lead 144.

To provide an ambient field at right angles to the switching fields developed by current pulses flowing through the word line conductors in accordance with this invention, a field forming arrangement 146 such as a pair of Helmholtz coils 148 and 150 are positioned at the top and bottom of the memory array 11. As well known in the art, the Helmholtz coils 148 and 150 may be coupled to suitable sources of potential (not shown). The magnetic field developed by the Helmholtz coils 148 and 150 as indicated by arrows 154, 156, 158 and 160 is substantially linear and parallel to the longitudinal axis of each of the word drive conductors such as 10 and 12. As will be explained subsequently, the ambient field developed by the coils 148 and 150 in combination with the direction of orientation of the thin film cores provides the reading operation in response to a single pulse of short duration.

It is to be noted that the ambient field may be developed by arrangements other than the Helmholtz coils such as by permanent magnets in accordance with the principles of this invention. The word line conductors and the sense and control conductors may be formed from strips of conductive material such as copper or aluminum coated with an insulating shellac or may be formed from deposited conductive materials. The thin film cores may be conventional thin film magnetic material deposited with the proper orientation on core mounting plates or may be deposited on the conductors themselves. As is well known in the art, the orientation is provided by depositing magnetic thin film material in the presence of a properly directed magnetic field.

Figure 2:
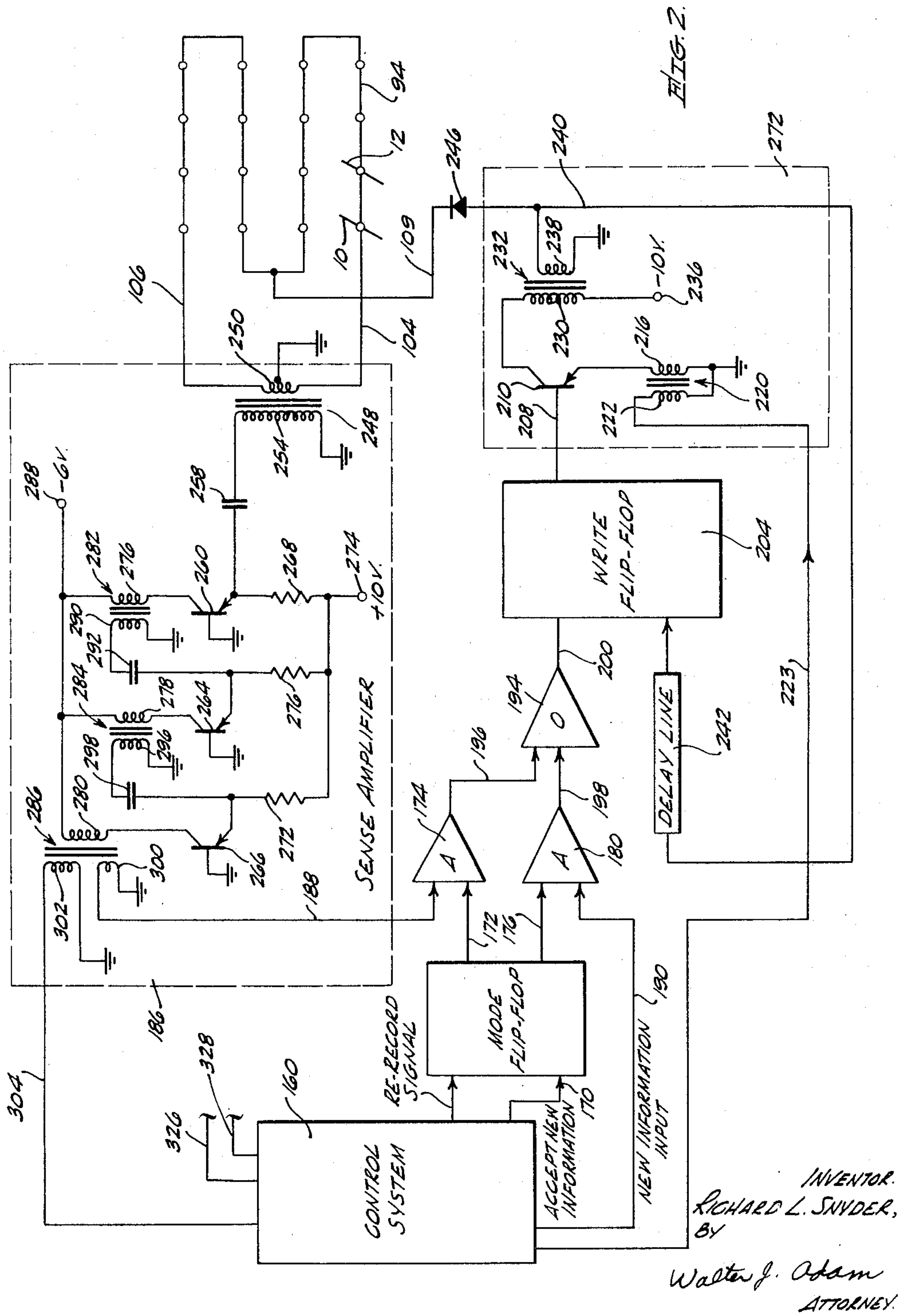
FIG. 2 is a schematic circuit and block diagram of the sense and control system that may be utilized with the memory array of FIG. 1 in accordance with the invention.

Before further explaining the arrangement of the magnetic elements, the sense and control amplifier system of FIG. 2 for controlling all cores in one bit position of the memory array of FIG. 1 will be explained. A control system 160 may include computer logical arrangements, registers and sources of timing signals. The write control system includes a mode control flip flop 164 which is set to a binary "one" state in response to a re-record signal applied thereto from the control system 160 through a lead 168. When new input information is to be written the flip flop 164 is set to a "zero" state in response to a signal applied thereto from the control system 160 through a lead 170 so that a high level signal is applied to the lead 176. For re-recording, a positive signal is applied from a first output terminal of the flip-flop 164 through a lead 172 to an "and" gate 174. When new information is to be written into the memory, a positive signal is applied from a second output terminal of the flip flop 164 through the lead 176 to an "and" gate 180. An information signal to be re-recorded is applied from a sense amplifier 186 through a lead 188 to the "and" gate 174 and a new informational signal is applied from the control system 160 through a lead 190 to the "and" gate 180. An "or" gate 194 responds to a signal applied through a lead 196 from the "and" gate 174 or to a signal applied through a lead 198 from the "and" gate 180 to apply a signal through a lead 200 to one input terminal of a write flip flop 204.

A first output terminal of the write flip flop 204 is coupled through a lead 208 to the base of a pnp type transistor 210 included in a control amplifier 212. The emitter of the transistor 210 is coupled through a winding 216 of a transformer 220 to ground. A second winding 222 of the transformer 220 has a first end coupled to ground and a second end coupled to a lead 223 to which is applied a write timing pulse from the control system 160. The collector of the transistor 210 is coupled to one end of a first winding 230 of a transformer 232, the other end of the winding 230 being coupled to a suitable source of potential such as a −10 volt terminal 236. A second winding 238 of the transformer 232 has a first end coupled to ground and a second end coupled to a lead 240 which in turn is coupled through a delay line 242 to a reset input terminal of the write flip flop 204. The lead 240 is also coupled through the anode to cathode path of a diode 246 to the lead 109 for writing a "one" into a core in the first bit position, for example, of a selected word line.

For sensing a binary "one" during reading in a core of a selected word line, which may be the core in the first bit position, the sense amplifier 186 includes a transformer 248 having a first winding 250 coupled to the leads 104 and 106 and a center tap coupled to a suitable source of reference potential such as ground. A second winding 254 of the transformer 248 has a first end coupled to a suitable source of reference potential such as ground and a second end coupled through a coupling capacitor 258 to the emitter of a pnp type transistor 260, forming a first amplifying stage. Second and third amplifying stages include respective pnp type transistors 264 and 266. The emitters of the transistors 260, 264 and 266 are coupled through respective resistors 268, 270 and 272 to a suitable source of potential such as a +10 volt terminal 274. The bases of the transistors 260, 264 and 266 are coupled to a reference potential such as ground. The collectors of the transistors 260, 264 and 266 are respectively coupled through first windings 276, 278 and 280 of respective transformers 282, 284 and 286 to a suitable source of potential such as a −6 volt terminal 288. The transformer 282 has a secondary winding 290 with one end coupled to ground and the other end coupled through a capacitor 292 to the emitter of the transistor 264. Also the transformer 284 has a secondary winding 296 with one end coupled to ground and the other end coupled through a capacitor 298 to the emitter of the transistor 266. The transformer 286 has secondary windings 300 and 302 with one end of the winding 300 coupled to ground and the other end coupled to the lead 188 for re-recording sensed information. The winding 302 has one end coupled to ground and the other end coupled to an output lead 304 which applies interrogated information to the control system 160. It is to be noted that for the other sense and control leads 108 and 126 of FIG. 1, an arrangement similar to that of FIG. 2 may be utilized operating from the control system 160 and in some arrangements, utilizing the mode flip flop 164 in common.

Figure 3:
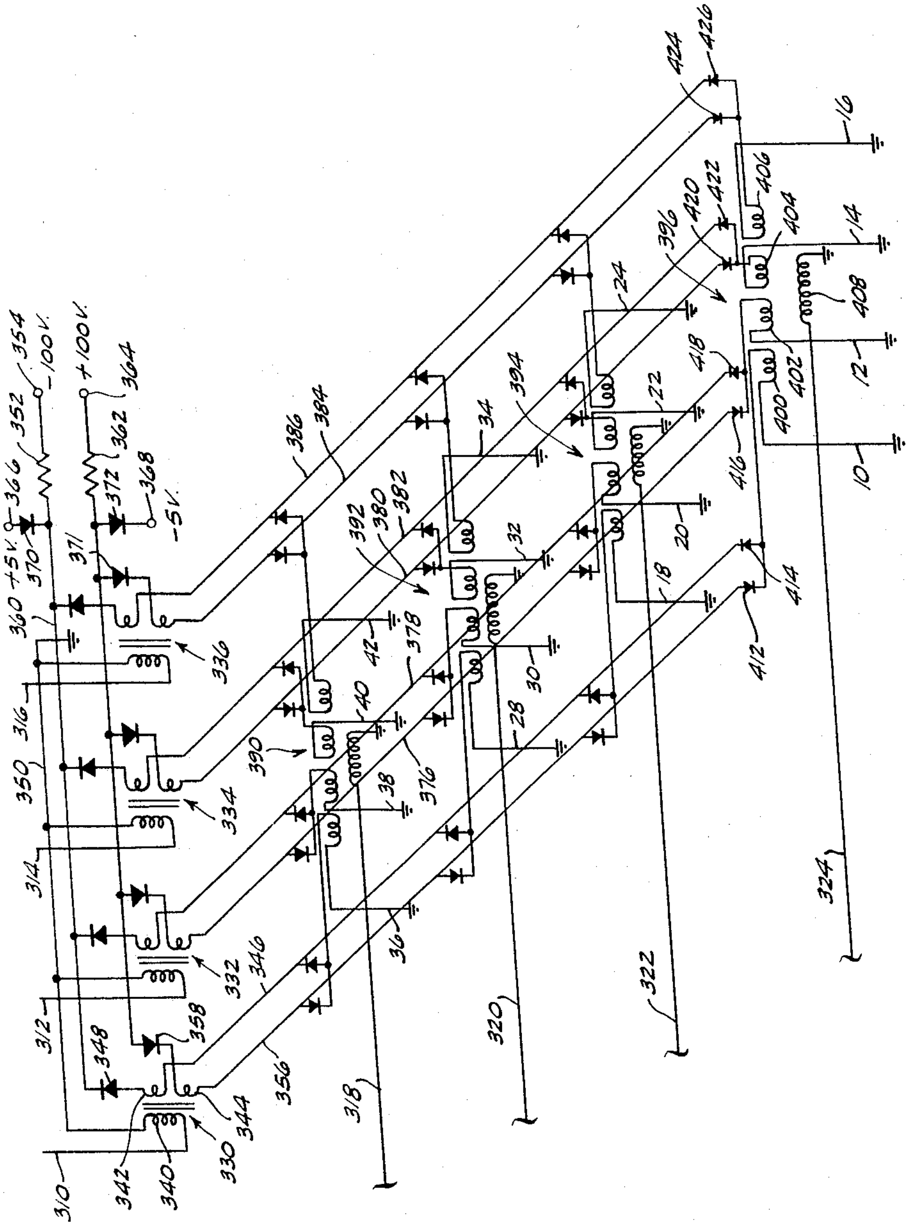
FIG. 3 is a schematic perspective diagram of a word selection system that may be utilized with the memory array of FIG. 1 in accordance with the invention.

Referring now to FIG. 3, a word selection system that may be utilized with the memory array of FIG. 1 includes column input leads 310, 312, 314 and 316 and row input leads 318, 320, 322 and 324. The column input leads and the row input leads may be coupled to the control system 160 of FIG. 2 through respective composite leads 326 and 328. The column selection system includes transformers 330, 332, 334 and 336. The transformer 330 has first, second and third windings 340, 342 and 344 with one end of the winding 340 coupled to ground and the other end coupled to the lead 310. The winding 342 has one end coupled to a write lead 346 and the other end coupled through the anode to cathode path of a diode 348 to a lead 350 which in turn is coupled through a resistor 352 to a suitable source of potential such as a −100 volt terminal 354. The winding 344 has a first end coupled to a read lead 356 and a second end coupled through the cathode to anode path of a diode 358 to a lead 360 which in turn is coupled through a resistor 362 to a suitable source of potential such as a +100 volt terminal 364. To control diode selection, suitable sources of potential such as a +5 volt terminal 366 and a −5 volt terminal 368 are respectively coupled to the leads 350 and 360 through the anode to cathode path of a diode 370 and through the cathode to anode path of a diode 372. The transformers 332, 334 and 336 which are similar to the transformer 330 respond to respective column input leads 312, 314 and 316 and are respectively coupled to leads 376 and 378, leads 380 and 382 and leads 384 and 386. The leads 376, 380 and 384 control reading selection and the leads 378, 382 and 386 control write selection of a word line.

Each row of word lines includes a transformer 390, 392, 394 or 396. The transformer 396 includes first windings 400, 402, 404 and 406 and a second winding 408. The winding 400 has a first end coupled to the word drive conductor 10 and a second end coupled through the cathode to anode path of a diode 412 to the lead 356 and coupled through the anode to cathode path of a diode 414 to the lead 346. The winding 402 has a first end coupled to the word drive conductor 12 and a second end coupled through the cathode to anode path of a diode 416 to the lead 376 and through the anode to cathode path of a diode 418 to the lead 378. Similarly, the winding 404 has a first end coupled to the word drive conductor 14 and a second end coupled through the cathode to anode path of a diode 420 to the lead 380 and through the anode to cathode path of a diode 422 to the lead 382. The winding 406 has a first end coupled to the word drive conductor 16 and a second end coupled through the cathode to anode path of a diode 424 to the lead 384 and through the anode to cathode path of a diode 426 to the lead 386. For selecting the first row of word lines, the winding 408 has a first end coupled to ground and a second end coupled to the row selection lead 324. The arrangements of the transformers 390, 392 and 394 are similar to those of the transformer 396 and will not be explained in detail. Thus, each row is selected in response to a pulse applied to the row input leads 318, 320, 322 or 324 which pulses may be positive during reading and negative during writing, and each column is selected in response to a column input pulse applied on the lead 310, 312, 314 or 316, which column selection pulses may be negative during reading and positive during writing. It is to be noted that during reading a potential of approximately ground is applied to leads such as 356 and during writing a potential such as ground is applied to leads such as 346.

Figure 4:
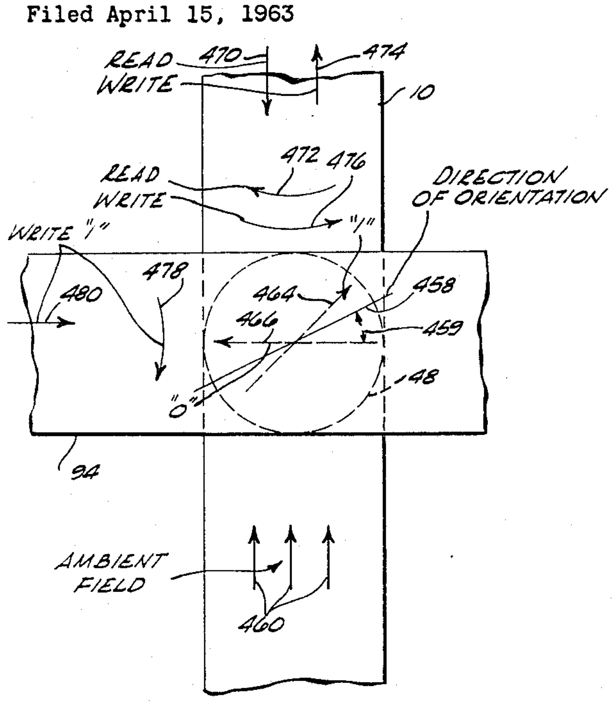
FIG. 4 is a schematic diagram of a thin film memory element of FIG. 1 for further explaining the operation of the memory system in accordance with the invention.

Referring now to FIG. 4, a thin film memory element typical of all the memory elements in the memory array 11 of FIG. 1 will be explained in further detail. The thin film core 48 may be positioned between the sense and control conductor 94 and the write drive conductor 10. The direction of orientation of the core 48 is shown by a line 458 to be at a selected angle relative to the axis of the drive conductor 10. This angle of tilt 459 may be approximately 10 degrees, for example. Thus, the easy direction of magnetization or direction of magnetic orientation of the core 48 is established when depositing the thin film material. Also, if the core is deposited on a separate structure, the angle 359 relative to the drive field developed by current flowing through the conductor 10, is determined by the selected mechanical position of the film 48. The ambient field provided by the Helmholtz coil arrangement 146, for example, is indicated by arrows 460 and may be applied parallel to the longitudinal axis of the word drive conductor 10. A stored binary "one" indicated by an arrow 464 has its field rotated to a greater angle than that of the direction of orientation or easy direction of magnetization of the line 458 as a result of the ambient field of the arrows 460. A stored "zero" indicated by an arrow 466 is rotated in response to the ambient field of the arrows 460 to a position substantially at right angles to the longitudinal axis of the word drive conductor 10. Thus, it can be seen that the magnetic orientation arrangement in accordance with this invention tilts or rotates a stored "one" relative to the word drive conductor 10 and tilts a stored "zero" to a position at right angles to the word drive conductor 10 so that the stored "one" of the arrow 464 will be switched by the magnetic field resulting from a current pulse applied to the conductor 10 while a stored "zero" will be substantially undisturbed by the field.

During reading, a current pulse of a short duration indicated by an arrow 470 develops a field of an arrow 472 which changes or switches a stored "one" of the arrow 464 to a "zero" state but has substantially no effect on the parallel field of a stored "zero" of the arrow 466. As is well known in the art, a thin film core in response to a short or brief current pulse that develops a field in the reverse direction from that existing in the core, will not alone switch the core to the opposite state. To cause the core to switch it is necessary to generate a relatively small field at right angles to that created by the main switching pulse. Thus the stored "zero" of the arrow 466 is not disturbed in response to the reading field of the arrow 472.

During writing, a current pulse indicated by an arrow 474 is applied through the selected conductor 10 for writing a binary "one" as well as for writing a binary "zero," with a binary "one" being selected by applying a current pulse to the sense and control lead such as 94. In response to the current pulse of the arrow 474, a field of an arrow 476 is applied to the stored "zero" of the arrow 466. Simultaneously a field of an arrow 478 for writing a binary "one" is applied to the stored "zero" of the arrow 466 in response to a current pulse indicated by an arrow 480. Thus during writing, the arrow 466 is tilted or rotated as the gyroscopic magnetic elements of the film 48 react, and in response to the writing field of the arrow 476, is switched to the "one" state of the arrow 464. It is to be noted that when a "zero" is to be written, a current pulse is not applied to the sense and control conductor 94.

Figure 5:
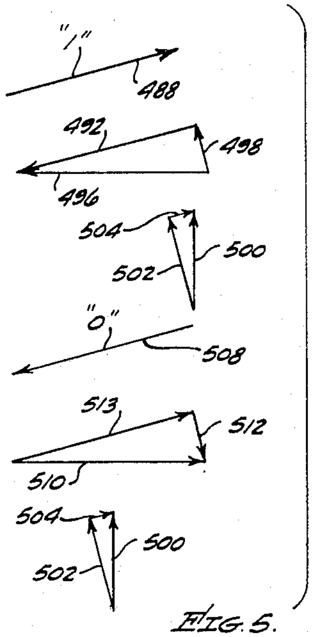
FIG. 5 is a schematic diagram of vectors for further explaining the operation of the thin film memory element of FIG. 5.

Referring now also to FIG. 5, an arrow 488 indicates the direction of orientation or of easy magnetization of a binary "one" which is at a selected angle with respect to the sense and control line and with the word line. A horizontal arrow 496 represents the direction of the magnetic field generated by the passage of a write current pulse through the word line such as 10 which field can be resolved into two components, one directly opposing the magnetism in the core as indicated by an arrow 492 and the other at right angles or transverse to the core flux as indicated by an arrow 498. The ambient field which may be developed by the Helmholtz coils provides a field perpendicular to the field of the word line as indicated by an arrow 500. This field of the arrow 500 can also be resolved into two components, one aiding the perpendicular component of the read pulse field indicated by an arrow 502 and the other slightly opposing the parallel component of the read field as indicated by an arrow 504. The two perpendicular components of the arrows 502 and 498 may be substantially equal and when summed, provide a magnetizing force equal to about one-third of the net reversing force of the core. Thus it can be seen that the ambient field rotates or tilts a stored binary "one" to a ready position as shown by the arrow 464 of FIG. 4 for being rapidly switched by a single current pulse of a short period applied through the word conductor 10. Because a stored "one" is further tilted to the position of the arrow 464, the switching component resulting from current passing through the word conductor 10 has slightly less magnitude than that of the vector component 492.

During the writing phase, all cores subject to a write drive signal will be initially in the "zero" condition. An arrow 508 indicates the direction of orientation of a stored "zero" in the absence of the ambient field or other applied fields. Under these conditions the field developed by a current pulse passing through the word conductor such as 10 indicated by an arrow 510 has a perpendicular component of an arrow 512 that opposes the ambient field perpendicular component of the arrow 502. Thus the perpendicular component of the write field and the ambient field effectively cancel each other and the direction of flux is in the position of the arrow 466 of FIG. 4. A component of an arrow 513 is provided opposite to the direction of the arrow 508. It is to be noted that because the stored "zero" has the position of the arrow 466 of FIG. 4, the switching field has substantially the magnitude of the arrow 510. Thus, in order to switch the stored "zero," a field is required to be also applied from the sense and control conductor such as 94.

Figure 6:
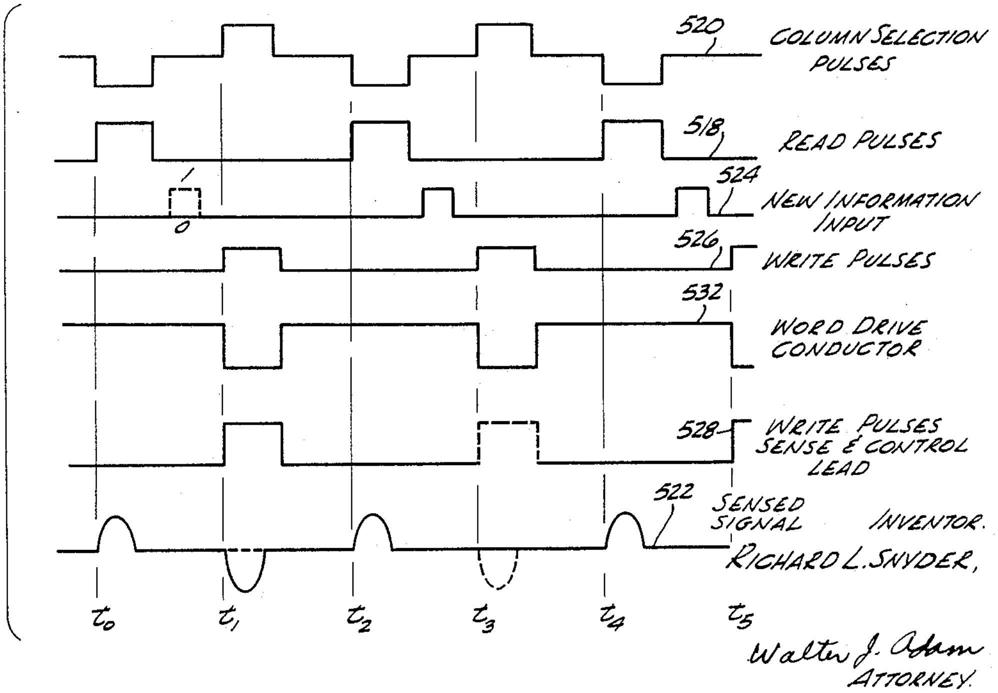
FIG. 6 is a diagram of waveforms as a function of time for explaining the operation of the memory system in accordance with the invention.

Referring now to FIG. 6 as well as to FIGS. 1, 2 and 3, the general system operation will be explained in further detail. For reading information stored in a word line such as 10, a read pulse of a waveform 518 is applied therethrough to develop fields which are applied to the cores 44, 46 and 48. For selection of a word line such as the word line 10, a column selection pulse of a waveform 520 is applied to the column input lead 310 at a time $t_0$. Simultaneously, a row selection pulse similar to the waveform 520, except reversed in polarity, is applied to the lead 324 from the control system 160. In response to the negative read pulse of the waveform 520 applied to the winding 340, a −5 volt potential normally provided by the terminal 368 is removed from the lead 356 and that lead is at approximately ground potential. In response to the row selection pulse on the lead 324 applied to the winding 408 the potential at the cathode of the diode 412 falls to −5 volts, for example. Thus, the word line 10 is selected and the read current pulse of the waveform 518 is applied through the word line conductor 10. The potential on the lead 346 which is normally maintained at +5 volts from the terminal 366 also goes to ground potential and applied to the diode 414 which remains non-conductive. As discussed previously, only a single pulse in the word line is required during reading. As a result, the cores 44, 46 and 48 in the binary "one" state are switched to the "zero" state as discussed relative to FIG. 5. Any of the cores 44, 46 and 48 in the "zero" state are undisturbed because the magnetic direction is parallel to the field developed by the current pulse passing through the word line 10. In response to a core such as 44 switching from the "one" to the "zero" state, a sense signal of a waveform 522 is applied to the leads 104 and 106 and amplified by the transistors 260, 264 and 266 in the sense amplifier 186. As a result, a signal similar to the waveform 522, except amplified, is applied to the lead 304 and to the control system 160 to be utilized such as in conventional logical operations. Also, if the information is to be re-recorded, the "and" gate 174 is opened and the interrogated "one" is applied through the "or" gate 194 to trigger the write flip flop 204 shortly after time $t_0$. If the interrogated core 44 is storing a binary "zero," a signal of the waveform 522 is not sensed as indicated by a dotted line and at that time, a signal is not applied to either the lead 188 or to the lead 304 which condition represents an interrogated "zero." It is to be noted that sense amplifier and write arrangements similar to that of FIG. 2 are utilized for controlling the cores 46 and 48 and for sensing the state of stored information.

If new information is to be recorded in the subsequent write portion of the cycle, a new information input signal of a waveform 524 may be applied through the lead 190 to the "and' gate 180 shortly after time $t_0$. A control signal (not shown) is applied to the mode flip flop 164 through the lead 170. Also for re-recording, a re-record signal may be applied to the flip flop 164 through the lead 168. As a result, the informational input signal of the waveform 524, which may be either a "zero" or a "one," is applied to the "and" gate 180 and similar signals are applied through the "or" gate 194 to the write flip flop 204. Thus, for example, a positive signal of the waveform 524, which may represent a "one," triggers the write flip flop 204 to a state to apply a negative signal to the lead 208. Thus the transistor 210 is biased out of conduction.

At time $t_1$, the write portion of the cycle is initiated by a write timing pulse of a waveform 526 applied from the control system 160 through the lead 223 to the transformer 220. As a result, a positive write pulse of a waveform 528 is passed through the lead 109 and through the sense and control lead 94 to apply a lateral write field to cores such as 50 and 54. It is to be noted that the positive timing pulse of the waveform 526 biases the transistor 210 into conduction so that the current pulse is applied through the diode 246.

Also at time $t_1$, the positive column selection pulse of the waveform 520 is applied to the lead 310 and an inverted row selection pulse is applied to the lead 324.

As a result, the potential on the leads 346 and 356 falls to approximately ground potential and the diode 414 is biased into conduction as a positive pulse is applied to the anode thereof. Thus, a write pulse of a waveform 532 is applied from ground through the word line conductor 10 and through the diode 414 in a direction opposite from the read pulse. As discussed relative to FIG. 5, the write pulse of the waveform 532 in combination with the write pulse of the waveform 528 on the lead 94 causes the core 44 to be triggered to the binary "one" state. If a "zero" is to be written into the core 44, the write pulse of the waveform 528, which provides the lateral rotating field, is omitted in the sense and control lead 94. Thus, for writing a "zero," a signal is not applied to the lead 200 to trigger the flip flop 204 which remains in its reset state so that a positive pulse is applied to the lead 208 at time $t_1$. Thus the transistor 210 remains non-conductive. In the absence of a field for rotating the magnetic elements in the sense and control lead 94, a stored "zero" is not disturbed by the parallel write field developed by current flowing through the word line conductor 10. It is to be noted that when a binary "one" is written into a core such as 44 the switching of the magnetic state develops a negative pulse of the waveform 522 such as at time $t_1$ which is not utilized by the control system 160.

For resetting the write flip flop 204, a write pulse signal similar to the waveform 528 is applied to the lead 240, delayed in the delay line 242 and applied to the write flip flop 204 to trigger that flip flop to the "zero" state. If a "zero" is being recorded into the thin film core 44, a signal is not fed back to the delay line 242 but the write flip flop 204 remains in the reset state representative of writing a "zero."

At time $t_2$, which is the start of the read portion of the next cycle, a column lead such as the lead 376 is selected in response to a negative pulse similar to the waveform 520 applied to the lead 312. Also, a row input lead is selected in response to a positive pulse applied for convenience of illustration to the lead 324. Thus a read current pulse of the waveform 518 is applied through the word conductor 12. As a result, the core such as 50 is switched to the opposite magnetic state if a binary "one" is stored therein. If the core 50 is storing a binary "zero," a signal is not sensed by the transformer 248 indicated by the solid portion of the waveform 522. Thus a signal is not applied to the lead 304 at time $t_2$ which represents an interrogated "zero." Also at time $t_2$, the "zero" may be re-recorded with the flip flop 204 remaining in the reset state or a new information input signal of the waveform 524 of either a "zero" or a "one" may be applied to the lead 190 shortly after time $t_2$ so that the write flip flip 204 remains either in the reset state or is triggered to the "one" state.

At time $t_3$, to write a binary "zero" into the core 50, a dotted current pulse of the lead 528 is not applied to the sense and control lead 94. In response to the positive pulse similar to the waveform 520 applied to the lead 312 and a negative pulse applied to the lead 324, the write pulse of the waveform 532 is applied through the word line conductor 12 but the core 50 is not switched to the "one" state because of the absence of a lateral field from the sense and control lead. Thus, for effectively writing a "zero" at time $t_3$, the core 50 remains in its "zero" state from the previous reading operation. The selection operation continues in a similar manner such as at times $t_4$ and $t_5$ and will not be discussed in further detail. It is to be noted that the operation is similar for other cores such as 52 and 54 of the selected word line.

Thus, during reading, a pulse is not applied through the sense and control line such as 94 so that unselected cores of each bit position are substantially unaffected. As a result, undesired sensed noise signals are substantially eliminated. Another feature in accordance with this invention is that when writing a "one" the field in the sense and control conductor overcomes the bias of the ambient field and unselected cores in the "one" state are disturbed a relatively small amount.

To define the amount of tilt or rotation of the direction of the stored magnetic field, the direction of orientation may be approximately 10 degrees relative to the field direction developed by the switching pulses in the word line conductors. It has been found desirable for optimum thin film rotational switching that the direction of orientation, the rotation of the magnetic field in response to the ambient field and the perpendicular field component developed by the signal in the sense and control lead should each contribute one-third of the total magnetic force in the word line conductor that is required to rotate the direction of magnetization 90 degrees.

Also in accordance with the principles of this invention the direction or angle of the ambient field relative to the cores may be shifted from a condition of being perpendicular to the switching field developed by the word line to other suitable angular conditions such as where the ambient field is perpendicular to the direction of orientation.

Thus there has been described an improved thin film memory system in which the thin film cores are magnetically oriented at a selected angle relative to the drive conductors. An ambient field is applied to all cores so as to maintain the cores in a first state such as a "one" in a ready condition for being rotationally switched during reading. However, the ambient field maintains all cores in a second state such as a "zero" with a direction of magnetic field to be substantially unaffected by read current pulses. Thus, reading is performed with a single pulse and undesired noise is substantially eliminated.

What is claimed is:

1. A system for storing first and second binary states comprising a first and a second conductor each having a longitudinal axis positioned substantially orthogonal to each other, a thin film magnetic core having a selected direction of magnetic orientation and positioned adjacent to said first and second conductors, means for applying an ambient field to said core in a fixed direction substantially parallel to said first conductor and with a fixed polarity for establishing said first binary state at a selected angle with the axis of said second conductor and said second binary state substantially parallel to the axis of said second conductor, first means coupled to said first conductor for applying current therethrough in a first direction for reading and in a second direction for writing, and second means coupled to said second conductor operative during writing for applying current therethrough in a predetermined direction for switching said core to said first state and for inhibiting current flow through said second conductor for maintaining said core in said second state.

2. A system for storing first and second binary states comprising first and second conductors each having a longitudinal axis positioned substantially orthogonal to each other, a thin film magnetic core positioned adjacent to said first and second conductors and having a direction of magnetic orientation at a selected angle with the axis of said first conductor, means for applying an ambient field to said core in a fixed direction substantially parallel to said first conductor and with a fixed polarity, first means coupled to said first conductor for applying current therethrough in a first direction for reading to switch the core from the first to the second binary state and in a second direction for writing to switch the core from the second to the first state in combination with a bit field, and second means coupled to said second conductor operative during writing for applying unidirectional current therethrough in a predetermined direction to form said bit field for switching said core to said first state and for inhibiting current flow through said second conductor for maintaining said core in said second state.

3. A combination for storing first and second binary states comprising first and second conductors each having a longitudinal axis, the longitudinal axes substantially at right angles to each other, a thin film magnetic core positioned adjacent to said first and second conductors and having a preferred direction of magnetic field orientation at a selected angle with the axis of said second conductor, means for applying an ambient field to said core substantially parallel to the axis of said first conductor, said ambient field having a magnitude to rotate the magnetic field of the core from the direction of orientation to a position to respond to a current pulse in said first conductor and switch to said second magnetic state, and when said core is in said second magnetic state, to rotate the magnetic field of said core to a position substantially perpendicular to the axis of said first conductor, read means coupled to said first conductor to apply a pulse thereto to provide a field to switch said core when in said first magnetic state to said second magnetic state, sense means coupled to said second conductor to respond to said core switching from said first to said second state, and write means coupled to said first and second conductor for applying during writing a pulse to said first conductor and a pulse to said second conductor for developing a combined field to switch said core to said first state.

4. A memory device for storing first and second binary states comprising first and second conductors, each having a longitudinal axis and positioned adjacent to each other, the longitudinal axis of said first conductor positioned substantially at right angles to the longitudinal axis of said second conductor, a thin film magnetic core positioned adjacent to said first and second conductors and having a direction of magnetic orientation at a selected angle relative to the longitudinal axis of said second conductor, means for applying an ambient field of a substantially constant amplitude and orientation to said thin film substantially parallel to the longitudinal axis of said first conductor, first means coupled to said first conductor for applying a current pulse therethrough in a first direction to develop a read field and in a second direction to develop a first write field, said read field switching said core from said first to said second states, second means coupled to said second conductor for applying a current pulse therethrough to develop a second write field, said first and second write fields in combination switching said core from said second state to said first state, sense means coupled to said second conductor, and means coupled to said first and second means for controlling said means to apply said first field and switch said core in said first magnetic state to said second magnetic state, and controlling said first and second means to apply said read field to said core to switch the core from said second to said first state.

5. A memory system comprising first conductive means having a longitudinal axis, a plurality of second conductive means each having a longitudinal axis positioned orthogonal to the axis of said first conductive means and at different intersections therealong, a plurality of thin film magnetic cores having a preferred direction of magnetic orientation and each positioned at a different intersection of said first and second conductive means, said cores having said preferred direction oriented at a selected angle relative to the axis of said second conductive means, ambient field producing means for applying an ambient field to said cores substantially parallel to said first conductive means, first driving means coupled to said first conductive means for applying a pulse of a first polarity for reading from and of a second polarity for writing into said plurality of cores, said pulse of a first polarity for reading from developing a field to switch said plurality of cores from a first binary state to a second binary state, second driving means coupled to each of said plurality of second conductive means for applying pulses to each of said first conductive means for writing the first binary state and for omitting a pulse when writing the second binary state, and sense means coupled to each of said plurality of second conductive means for responding to the core switching to the second binary state in response to the pulses of said first polarity.

6. A memory system for storing first and second magnetic states comprising a plurality of word lines, a plurality of control lines intersecting each of said word lines substantially at right angles thereto, field producing means for applying an ambient magnetic field of fixed magnetic orientation to the intersection of said word lines and said control lines substantially parallel to said word lines, a plurality of thin film cores each positioned at an intersection of said word lines and control lines, said cores each having a direction of magnetic orientation at a selected angle relative to said control lines to respond to said field producing means so that a current pulse applied through a word line in a first direction switches the core from a first to a second magnetic state and so that a core in the second magnetic state has the direction of magnetism rotated to an angle substantially at right angles to said word line so as to be substantially unaffected by said pulse in the first direction in the selected word line, word selection means coupled to said word lines for applying a current pulse through a selected word line in said first direction for reading and in a second direction for writing, write selection means coupled to said control lines for selectively applying current pulses through said control lines in a predetermined direction for writing, control means coupled to said word selection means and to said write selection means for controlling said means to apply during reading, a pulse in said first direction through a selected word line and for applying during writing of a first magnetic state, a pulse in said second direction through the selected word line and a pulse through selected control lines in said predetermined direction and during writing of a second magnetic state applying said pulse in said second direction through said selected word line in coincidence with the absence of a pulse on said selected control line, and sense means coupled to said control lines for responding to the cores changing state during reading.

References Cited by the Examiner

UNITED STATES PATENTS

| | | | |
|---|---|---|---|
| 3,066,283 | 11/1962 | Davis | 340—174 |
| 3,076,958 | 2/1963 | Pohm | 340—174 |
| 3,175,201 | 3/1965 | Slonczewski | 340—174 |

JAMES W. MOFFITT, *Acting Primary Examiner.*

S. URYNOWICZ, *Assistant Examiner.*